United States Patent [19]

Masciarelli, Jr.

[11] Patent Number: 4,946,637
[45] Date of Patent: Aug. 7, 1990

[54] MOLDING METHOD

[76] Inventor: Victor J. Masciarelli, Jr., 18 Salem End La., Framingham, Mass. 01701

[21] Appl. No.: 297,149

[22] Filed: Jan. 17, 1989

[51] Int. Cl.$^5$ .............................................. B29C 33/42
[52] U.S. Cl. .......................... 264/226; 264/DIG. 55; 425/180
[58] Field of Search ............... 264/219, 220, 221, 225, 264/226, 227, DIG. 55; 425/177, 179, 180

[56] References Cited

U.S. PATENT DOCUMENTS

| 3,408,436 | 10/1968 | Cubitt | 264/225 |
| 3,846,533 | 11/1974 | Carrier | 264/220 |
| 4,824,628 | 4/1989 | Curfman | 264/278 |
| 4,834,929 | 5/1989 | Dehoff et al. | 264/226 |

FOREIGN PATENT DOCUMENTS

| 55-39335 | 3/1980 | Japan | 264/225 |
| 62-187002 | 8/1987 | Japan | 264/225 |

Primary Examiner—Jan H. Silbaugh
Assistant Examiner—Mathieu Vargot
Attorney, Agent, or Firm—John E. Toupal; Harold G. Jarcho

[57] ABSTRACT

A method for making reusable mold halves whereby mold aligning perturbations are directly formed in the process. Two mold parts are superimposed, one having a cavity for retaining the mold to be reproduced and the other having cavities for forming the perturbations. A molding compound is introduced into the cavities which, upon hardening, forms a first mold piece including the model and the perturbations. The mold piece is retained within one of the mold parts, turned upside down, and superimposed with another mold part. Molding compound is introduced into the assembly and hardens to form a second mold piece formed with recesses that are complementary to the perturbations. The mold pieces are separated from the mold parts and the model is removed to form two aligning mold halves.

10 Claims, 1 Drawing Sheet

MOLDING METHOD

BACKGROUND OF THE INVENTION

This invention relates generally to a molding method and apparatus and, more particularly, to a molding method and apparatus for specific use in the production of custom jewelry.

Conventionally, custom jewelry is produced in an appropriately shaped cavity of a rubber mold. Creation of the mold typically entails the steps of placing a model in a mold frame, filling the mold frame with a thermosetting molding compound, inducing hardening of the molding compound to provide a unitary mold, and then cutting the unitary mold into matching halves along a parting plane that includes the model. The latter step is quite labor intensive and adds significantly to the ultimate cost of jewelry produced with the mold.

The object of this invention, therefore, is to provide an improved molding method and apparatus for use in producing custom jewelry.

SUMMARY OF THE INVENTION

The invention is a mold apparatus including a first mold part defining a substantially planar base surface interrupted by perturbations such as spaced apart recesses; a second mold part having a substantially planar bottom surface with a first inner annular periphery, a substantially planar top surface with a second inner annular periphery, and first walls extending between the first and second peripheries and defining a first mold cavity; a third mold part having a substantially planar lower surface with a third inner annular periphery, an upper surface, and second walls extending from the third periphery and defining a second mold cavity; first locator means for aligning the first and second mold parts so as to provide a sealing engagement between the base and bottom surfaces and an encompassing of said recesses by the first periphery; and second locator means for aligning the second and third mold parts so as to provide a sealing engagement between the lower surface and at least one of the top and bottom surfaces and communication between the first and second mold cavities. With appropriate sequential use of the first, second and third mold parts, a pair of geometrically keyed mold pieces can be produced.

According to one feature of the invention, the first walls extend substantially normal to the bottom surface; the second walls extend substantially normal to the lower surface; the first, second and third peripheries correspond dimensionally; the third mold part has a substantially planar upper surface with a fourth inner annular periphery corresponding dimensionally to the first, second and third peripheries; the top and bottom surfaces are parallel; and the upper and lower surfaces are parallel. This arrangement provides a three part mold with particularly desirable geometry for producing custom jewelry with a vice type clamp.

According to other features of the invention, the first locator means comprises a plurality of first holes in the first mold part and a plurality of pins retained by the second mold part and oriented to be receivable by the first holes, and the second locator means comprises a plurality of second holes in the third mold part and aligned with the pins so as to be receivable thereby. The holes and pins conveniently provide the required alignment of the mold parts.

According to yet another features of the invention at least two of the recesses are non-uniformly spaced from the first periphery with the first and second mold parts engaged by the first locator means. Non-uniformly spaced recesses insure production by the first, second and third mold parts of a pair of mold pieces that can only be aligned correctly during a molding operation.

According to further features of the invention, the first, second, third and fourth peripheries are rectangular; and the recesses include a corner recess adjacent each corner of the first periphery with the first and second mold parts engaged by the first locator means, and another recess spaced from said corner recesses. This arrangement provides the desired non-uniform recess spacing.

The invention also encompasses a molding method comprising the steps of providing a first mold part defining a substantially planar base surface interrupted by a plurality of spaced apart perturbations providing a second mold part having a substantially planar bottom surface with a first inner annular periphery, a substantially planar top surface with a second inner annular periphery, and first walls extending between said first and second peripheries; engaging the base surface of the first mold part with the bottom surface of the second mold part such that the first inner annular periphery encompasses the perturbations; positioning a model to be reproduced on the base surface within a first cavity formed by the first walls, the base surface and the recesses; filling the first cavity and the recesses with a pliable mold compound; effecting hardening of the mold compound to provide a first mold piece; removing the first mold part from the second mold part so as to expose a molded surface of the first mold piece having disturbances formed by the perturbations and retaining the model; providing a third mold part having a substantially planar lower surface with a third inner inner periphery, an upper surface, and second walls extending from the third periphery; engaging the bottom surface of the second mold part with the lower surface of the third mold part so as to form a second cavity defined by the molded surface and the second walls and retaining the object; filling the second cavity with a pliable mold compound; effecting hardening of the mold compound in the second cavity to provide a second mold piece; separating the first and second mold pieces; and removing the model. This method significantly simplifies the creation of reusable mold halves for the production of custom jewelry.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
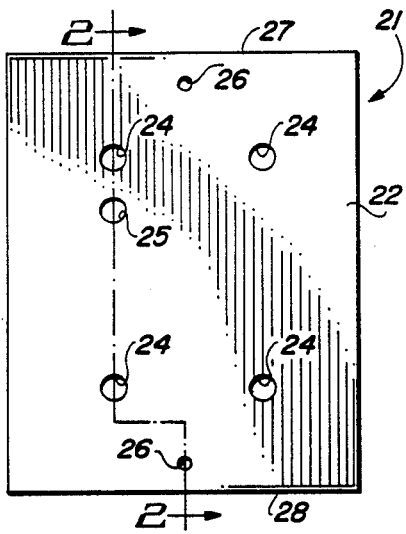
FIG. 1 is a plan view of a first mold part according to the invention.
Figure 2:
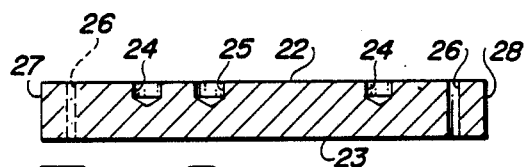
FIG. 2 is a side view of the first mold part shown in FIG. 1.

A first mold part 21 shown in FIGS. 1 and 2 is a rectangular plate having a planar base surface 22 and a planar back surface 23. Interrupting the base surface 22 are four rectangularly distributed corner recesses 24 and another recess 25 aligned with two of the recesses 24. A pair of first locator holes 26 extend through the first mold part 21 adjacent to opposite edges 27, 28 thereof.

Figure 3:
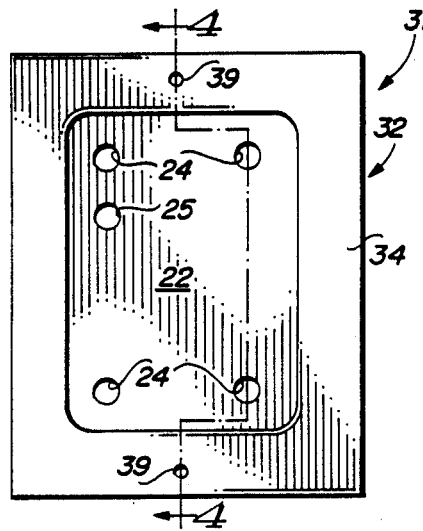
FIG. 3 is a plan view of an assembled mold including the first mold part of FIG. 1, and a second mold part according to the invention.
Figure 4:
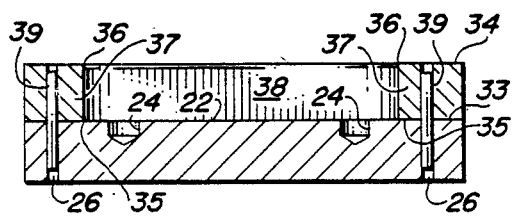
FIG. 4 is a cross-sectional view of the assembled mold shown in FIG. 3 taken along lines 4—4.
Figure 9:
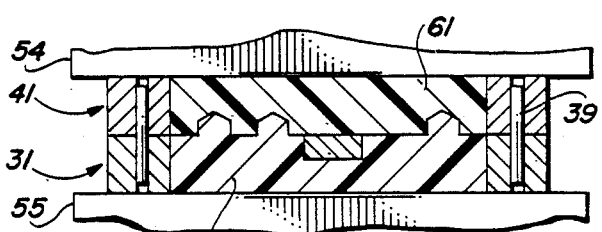
FIG. 9 is a cross-sectional view illustrating use of the assembled mold shown in FIGS. 5 and 6.
Figure 10:
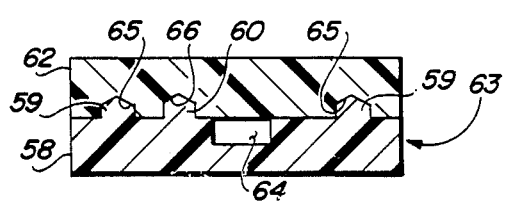
FIG. 10 is a cross-sectional view of an assembled composite mold including the mold pieces produced with the molds shown in FIGS. 7 and 9.

Illustrated in FIGS. 3 and 4 is a composite mold 31 including the first mold part 21 of FIG. 1 and a second mold part 32. Forming the second mold part 32 is a rectangular annular plate 32 with an annular planar bottom surface 33 and an annular planar top surface 34. The bottom surface 33 has a first annular inner periphery 35 and the top surface 34 has a second inner annular periphery 36. Extending between the first and second peripheries 35, 36 are first walls 37 that encompass a first mold cavity 38. The dimensions of the first and second peripheries 35, 36 are uniform so that the first walls 37 project normal to the base surface 22 of the first mold part 21. A pair of locator pins 39 project from opposite legs of the bottom surface 33 and are received by the locator holes 26 in the first mold part 21. Proper alignment of the composite mold 31 is established by inserting the locator pins 39 of the second mold part 32 into the locator holes 26 in the first mold part 21. With the mold parts 21, 32 thus aligned, the corner recesses 24 in the base surface 22 are located directly adjacent to each corner of the first inner periphery 35 of the bottom surface 33 and the other recess 25 is spaced from the first periphery 35 non-uniformly with respect to any of the corner recesses 24.

Figure 5:
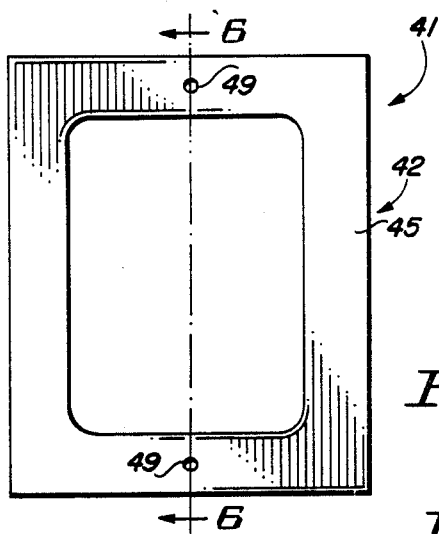
FIG. 5 is a plan view of another assembled mold including the second mold part of FIG. 4 and a third mold part according to the invention.
Figure 6:
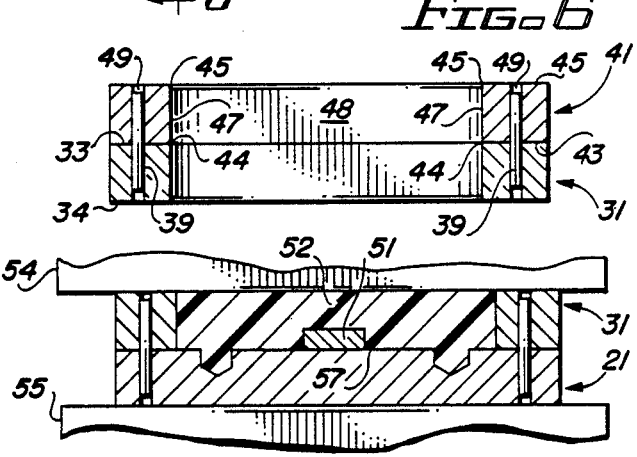
FIG. 6 is a cross-sectional view of the assembled mold taken along lines 6—6 shown in FIG. 5.

Another composite mold 41 is shown in FIGS. 5 and 6 and includes the second mold part 32 and a third mold part 42 formed by a rectangular, annular plate. The third mold part 42 has a planar annular lower surface 43 with a third annular inner periphery 44 and a planar annular upper surface 45 with a fourth annular inner periphery 46. Extending between the inner peripheries 44 and 46 are second walls 47 encompassing a second mold cavity 48. The third and fourth inner peripheries 44, 46 are uniformly dimensioned with respect to the first and second peripheries 35, 36 of the second mold part 32 so as to provide planar alignment of the first and second walls 37, 47. A pair of second locating holes 49 extend through mid-portions of opposite legs of the second third mold part 42. Proper alignment of the composite mold 41 is obtained by inserting the locator pins 39 of the second mold part 32 into the locator holes 49 of the third mold part 42.

Figure 7:
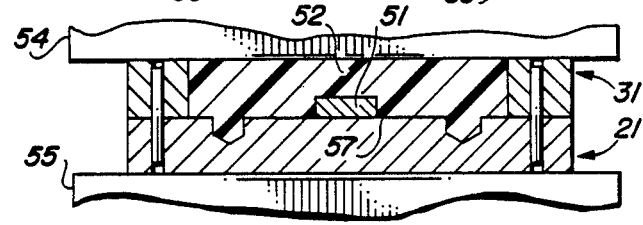
FIG. 7 is a cross-sectional view illustrating use of the assembled mold shown in FIGS. 3 and 4.
Figure 8:
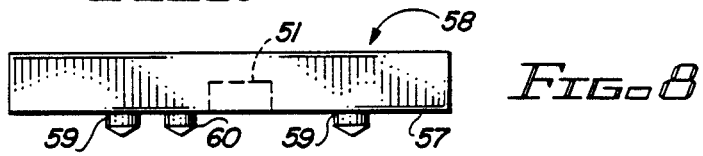
FIG. 8 is a side view of a mold piece produced by the assembled mold shown in FIGS. 3 and 7.

During use of the composite mold 31 an object 51 to be reproduced is placed on the base surface 22 of the first mold part 21 within the first mold cavity 38 as shown in FIG. 7. The first mold cavity 38 and the recesses 24, 25 then are filled with a suitable pliable molding compound 52. A complete filling of the cavity 38 and the recesses 24, 25 is insured by closing a pair of vice jaws 54, 55 against, respectively, the planar top surface 34 of the second mold part 32 and the planar back surface 23 of the first mold part 21. After application of heat to cure and harden the molding compound 52, the jaws 54 and 55 are separated and the first mold part 21 is removed from the composite mold 31 to expose a molded surface 57 of a first mold piece 58 (FIG. 8) that retains the model 51. Extending from the molded surface 57 are four corner projection disturbances 59 and a displaced projection disturbance 60 formed, respectively, by the perturbation recesses 24, 25 during the molding operation.

The composite mold 41 then is assembled by inserting into the locator holes 49 on the third mold part 42 the locator pins 39 of the second mold part 32 which still retains the first mold piece 58. After application of a release agent such as silicon liquid to the molded surface 57, the second mold cavity 48 formed by the second walls 47 and the molded surface 57 then is filled with a pliable molding compound 61. Complete filling of the mold cavity 48 is insured by closing the vice jaws 54, 55, respectively, against the top surface 34 of the second mold part 32 and the upper surface 45 of the third mold part 42. After applying heat to cure and harden the molding compound 61 producing a second mold piece 62, the jaws 54, 55 are separated to permit removal of the composite mold 41. Next, the first mold piece 58 and second mold piece 62 are removed from the composite mold 41 and separated along the molded surface 57. After removal of the model 51 the resultant hollow mold 63 consisting of the mold pieces 58 and 62 can be used to reproduce duplicates of the model 51 by filling a cavity 64 produced by its removal. During such molding operations, an exact alignment between mold pieces 58 and 62 is insured by insertion of the projections 59 and 60 on the first mold piece 58 into corner recesses 65, and a displaced recess 66 formed in the second mold piece 62 during the above described operation. Proper orientation between the mold pieces 58 and 62 is insured by registration of the displaced projection 60 with its counterpart displaced recess 66 in the second mold piece 61.

Obviously, many modifications and variations of the present invention are possible in light of the above teachings. It is to be understood, therefore, that the invention can be practiced otherwise than as specifically described.

What is claimed:

1. A molding method comprising the steps of:
 providing a first mold part defining a substantially planar base surface interrupted by a plurality of spaced apart perturbations;
 providing a second mold part having a substantially planar bottom surface with a first inner annular periphery, a substantially planar top surface with a second inner annular periphery, and first walls extending between said first and second peripheries;
 engaging said base surface of said first mold part with said bottom surface of said second mold part such that said first inner annular periphery encompasses said perturbations;
 positioning a model to be reproduced on said base surface within a first cavity formed by said first walls, said base surface and said perturbations;

filling said first cavity with a pliable mold compound;

effecting hardening of said mold compound to provide a first mold piece;

removing said first mold part from said second mold part while retaining said first mold piece in said second mold part so as to expose a molded surface of said first mold piece having complementary disturbances formed by said perturbations and including said model;

providing a third mold part having a substantially planar lower surface with a third inner annular periphery, an upper surface, and second walls extending from said third periphery;

engaging said bottom surface of said second mold part with said lower surface of said third mold part while retaining said first mold piece in said second mold part so as to form a second cavity defined by said molded surface and said second walls and retaining said object;

filling said second cavity with a pliable mold compound;

effecting hardening of said mold compound in said second cavity to provide a second mold piece;

separating said first and second mold pieces; and removing said model.

2. A molding method according to claim 1 wherein said third periphery corresponds dimensionally to at least one of said first and second peripheries.

3. A molding method according to claim 2 wherein said first walls extend substantially normal to said bottom surface, and said second walls extend substantially normal to said lower surface.

4. A molding method according to claim 3 wherein said first, second and third peripheries correspond dimensionally.

5. A molding method according to claim 4 wherein said third mold part has a substantially planar upper surface with a fourth inner annular periphery corresponding dimensionally to said first, second and third peripheries.

6. A molding method according to claim 5 wherein said top and bottom surfaces are parallel, and said upper and lower surfaces are parallel.

7. A molding method according to claim 6 wherein said first, second, third and fourth peripheries are rectangular.

8. A molding method according to claim 7 wherein said perturbations comprise a corner recess adjacent each corner of said first periphery with said first and second mold parts engaged, and another recess spaced from said corner recesses.

9. A molding method according to claim 1 wherein at least two of said perturbations are non-uniformly spaced from said first periphery with said first and second mold parts engaged.

10. A molding method according to claim 1 including the step of applying a release agent to said molded surface before filling said second cavity with said molding compound.

* * * * *